US011687804B2

(12) United States Patent
Zoldi et al.

(10) Patent No.: US 11,687,804 B2
(45) Date of Patent: Jun. 27, 2023

(54) LATENT FEATURE DIMENSIONALITY BOUNDS FOR ROBUST MACHINE LEARNING ON HIGH DIMENSIONAL DATASETS

(71) Applicant: FAIR ISAAC CORPORATION, Roseville, MN (US)

(72) Inventors: Scott Michael Zoldi, San Diego, CA (US); Shafi Ur Rahman, San Diego, CA (US)

(73) Assignee: Fair Isaac Corporation, Roseville, MN (US)

( * ) Notice: Subject to any disclaimer, the term of this patent is extended or adjusted under 35 U.S.C. 154(b) by 339 days.

(21) Appl. No.: 16/917,603

(22) Filed: Jun. 30, 2020

(65) Prior Publication Data

US 2021/0406724 A1 Dec. 30, 2021

(51) Int. Cl.
*G06F 7/00* (2006.01)
*G06N 5/04* (2023.01)
(Continued)

(52) U.S. Cl.
CPC ............... *G06N 5/04* (2013.01); *G06N 5/027* (2013.01); *G06N 20/00* (2019.01)

(58) Field of Classification Search
CPC ............. G06F 16/9024; G06F 16/2379; G06F 16/9032; G06F 16/3347; G06F 16/2237;
(Continued)

(56) References Cited

U.S. PATENT DOCUMENTS

2010/0161464 A1* 6/2010 Solotorevsky ....... G06Q 20/102 705/40
2021/0041596 A1* 2/2021 Kushwaha ............ G01V 1/282
(Continued)

OTHER PUBLICATIONS

Subbotin, S.A. (Published Jan. 24, 2018, Issue date Oct. 2017). "The Neural Network Model Synthesis Based on the Fractal Analysis." Opt. Mem. Neural Networks, vol. 26, No. 4, 257-273. Allerton Press, Inc. DOI: https://doi.org/10.3103/S1060992X17040099.

*Primary Examiner* — Mohammad A Sana
(74) *Attorney, Agent, or Firm* — Mintz, Levin, Cohn, Ferris, Glovsky and Popeo, P.C.; F. Jason Far-hadian, Esq.

(57) ABSTRACT

Computer-implemented methods and systems for quantifying appropriate machine learning model complexity corresponding to training dataset are provided. The method comprises monitoring, using one or more processors, N observed variables, $v_1$ through $v_N$, of a training dataset for a machine learning model; translating the N observed variables into m equisized bin indexes which generate $m^N$ possible equisized hypercells to estimate a fundamental dimensionality for the dataset; generating one or more samples by assigning a record in the dataset with numbers j through k as set id; generating a merged sample Si, for one or more values of the set id i, where i goes from j to k; and computing a fractal dimension of the equisized hypercube phase space based on count of cells with data coverage of at least one data point.

20 Claims, 8 Drawing Sheets

(51) Int. Cl.
*G06N 20/00* (2019.01)
*G06N 5/02* (2023.01)

(58) Field of Classification Search
CPC .......... G06F 30/27; G06N 5/04; G06N 20/00; G06N 5/027; G06N 3/088; G06N 3/084; G06N 3/0454
See application file for complete search history.

(56) References Cited

U.S. PATENT DOCUMENTS

| | | | | |
|---|---|---|---|---|
| 2021/0125091 A1* | 4/2021 | Fang | ...................... | G06N 3/084 |
| 2021/0270127 A1* | 9/2021 | Zhu | .................... | E21B 47/0025 |

* cited by examiner

| | |
|---|---|
| (1, 1, 1) | 221 |
| (1, 1, 2) | 107 |
| (1, 2, 1) | 114 |
| (1, 2, 2) | 268 |
| (2, 1, 1) | 135 |
| (2, 1, 2) | 151 |
| (2, 2, 1) | 162 |
| (2, 2, 2) | 157 |

(a)

| | |
|---|---|
| (1, 1, 1) | 1 |
| (1, 1, 2) | 1 |
| (1, 2, 1) | 1 |
| (1, 2, 2) | 1 |
| (2, 1, 1) | 1 |
| (2, 1, 2) | 1 |
| (2, 2, 1) | 1 |
| (2, 2, 2) | 1 |

(b)

| | |
|---|---|
| (1,1,1) | 101 |
| (1,1,2) | 46 |
| (1,2,1) | 80 |
| (1,2,3) | 98 |
| (1,3,2) | 50 |
| (1,3,3) | 59 |
| (2,1,1) | 51 |
| (2,1,3) | 43 |
| (2,2,1) | 142 |
| (2,2,3) | 57 |
| (2,3,2) | 150 |
| (2,3,3) | 55 |
| (3,1,1) | 57 |
| (3,1,3) | 78 |
| (3,2,1) | 48 |
| (3,2,3) | 58 |
| (3,3,1) | 91 |
| (3,3,3) | 51 |

LATENT FEATURE DIMENSIONALITY BOUNDS FOR ROBUST MACHINE LEARNING ON HIGH DIMENSIONAL DATASETS

TECHNICAL FIELD

The disclosed subject matter relates to providing latent feature dimensionality bounds for robust machine learning on high dimensional datasets.

BACKGROUND

With data driven decision models becoming increasingly common, decision models are being built to predict or estimate a specific outcome that forms the basis for automated decisions. Most models are built using datasets collected as part of standard business processes. The datasets are first curated and cleaned before the data sets are used for building the decision models and typically contain as much data as possible to drive a decision.

Data used for building a decision model typically includes the observed phenomena corresponding to the business processes, which is essentially what the decision model is trying to predict to inform a decision. The data collected is used in predicting an outcome, but the actual combination of data elements and subsequent machine learning formulas are hidden by both physical processes and the approximation of the relationships describing a process.

Relationships that are hidden, or latent in describing a process, are generally referred to as latent variables. Some of these latent variables could be attributed to the way data collection happens and not necessarily based on catching key decision variables. Realistically, understanding the nature of the key decision variables and how to collect the actual driving variables or latent variables is impractical, expensive or just impossible, considering the complex nature of relationships and variables that implement a decision model.

This inability to directly observe and quantify the direct causal driving variables of an outcome is one of the biggest challenges in working with data driven decisions and is the key reason for the rise in machine learning models, also referred to as artificial intelligence (AI) models. A machine learning model approximates the latent variables based on the data elements made available to the machine learning algorithms. Finding the fundamental dimensionality or the count of latent features defining the decision is typically extremely hard and may be based on a combination of long-term research into decision variables (decades in some problem areas), incredibly insightful data scientists, or sheer luck.

A lack of understanding of the fundamental dimensions of a decision model can have adverse implications. For example, incorrect or inaccurate estimation of the dimensions can lead to the decision model learning spurious or non-causal relationships, which are the result of noise in the data collected. Improved methods and systems are needed to compute the latent feature dimensionality of any given dataset. Having an understanding of the latent feature dimensionality will help improve the existing machine learning models to be more robust and stable.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one or more embodiments, computer-implemented methods, products and systems for quantifying appropriate machine learning model complexity corresponding to a training dataset are provided. The method comprises monitoring, using one or more processors, N observed variables, $v_1$ through $v_N$, of a training dataset for a machine learning model, as provided in further detail below.

Depending on implementation, the N observed variables may be translated into m equisized bin indexes which generate $m^N$ possible equisized hypercells to estimate a fundamental dimensionality for the dataset. and one or more samples may be generated by assigning a record in the dataset with numbers j through k as set id. A merged sample Si, may be generated for one or more values of the set id i, where i goes from j to k. A fractal dimension of the equisized hypercube phase space may be computed based on count of cells with data coverage of at least one data point.

In one implementation, training data in the training dataset excludes class labels for the purpose of computing latent feature dimensionality. The samples may be generated as k-fold cross samples applied to the training dataset to randomly split the training dataset into k subsets. The N observed variables may be normalized to a range of 0 to 1 and translated into m equisized bin indexes. The m equisized bin indexes generate $m^N$ possible equisized hypercells with edge size 1/m. The sample Si includes records with set ids 1 through k, excluding i. The binning starts from two bins and the number of bins is iteratively increased by splitting the bins into equisized bins of 1/m.

In accordance with one or more aspects, a fractional dimension may be approximated by the box-counting dimension with a minimum coverage, wherein the fractal dimension is computed using k-cross fold validation. A fundamental embedding dimension or optimal number of latent features may be given by Takens Theorem. A population of $m^N$ possible equisized hypercells may be represented by a key value NOSQL database. The key value may be an index of N bin values corresponding to N variables in the data set. The population of $m^N$ possible equisized hypercells may be the number of initialized values of the NOSQL database.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIG. 5 shows the hypercell vector keys, where the values correspond to the counts of the data points and, for example, the number of entries in the database is smaller than the total possible number of hypercells, $m^N$ in accordance with one or more embodiments.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
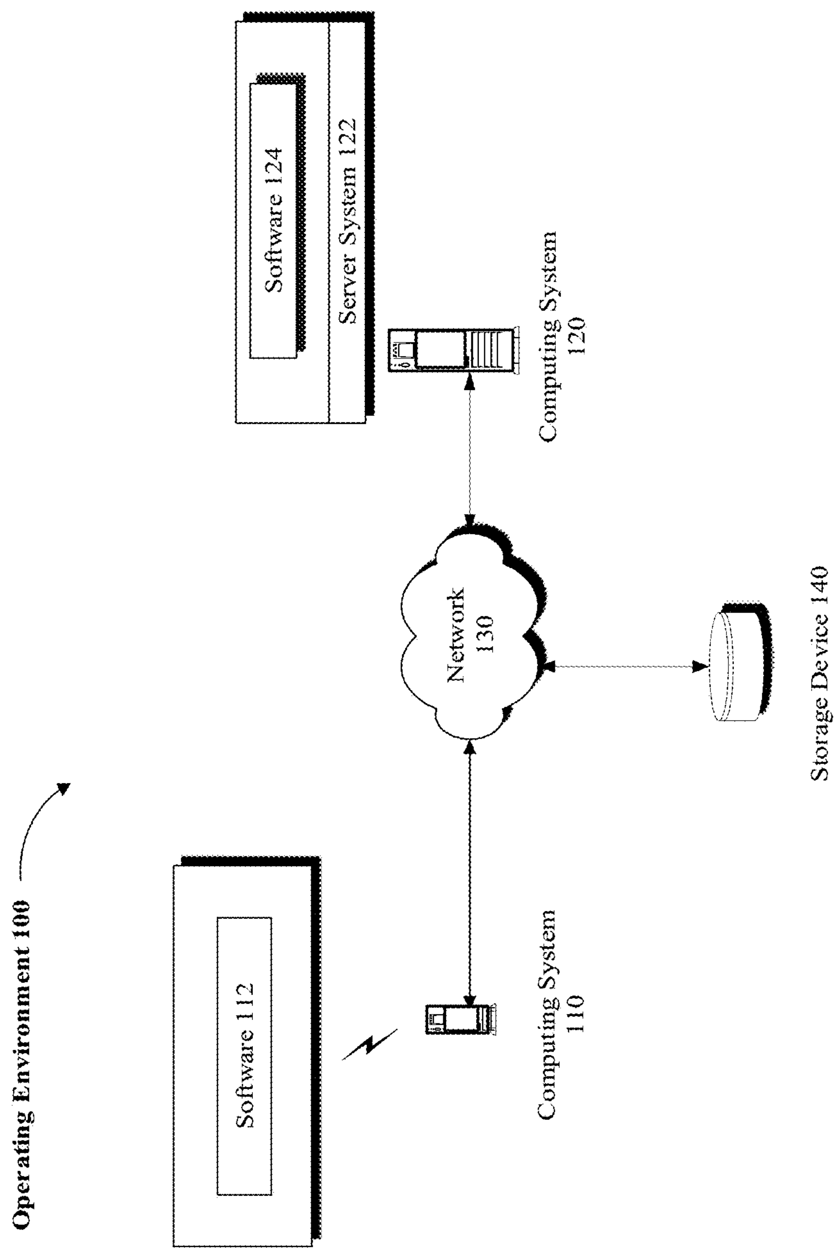
FIG. 1 illustrates an example operating environment in accordance with one or more embodiments, where latent feature dimensionality bounds for robust machine learning on high dimensional datasets may be defined.

Referring to FIG. 1, an example operating environment 100 is illustrated in which a computing system 110 may be used to interact with software 112 being executed on computing system 110. Computing system 110 may communicate over a network 130 to access data stored on storage device 140 or to access services provided by a computing system 120. Depending on implementation, storage device 140 may be local to, remote to, or embedded in one or more of computing systems 110 or 120. A server system 122 may be configured on computing system 120 to service one or more requests submitted by computing system 110 or software 112 (e.g., client systems) via network 130. Network 130 may be implemented over a local or wide area network (e.g., the Internet).

Computing system 120 and server system 122 may be implemented over a centralized or distributed (e.g., cloud-based) computing environment as dedicated resources or may be configured as virtual machines that define shared processing or storage resources. Execution, implementation or instantiation of software 124, or the related features and components (e.g., software objects), over server system 122 may also define a special purpose machine that provides remotely situated client systems, such as computing system 110 or software 112, with access to a variety of data and services as provided below. In accordance with one or more implementations, the provided services by the special purpose machine or software 124 may include providing the ability to estimate the correct fundamental dimensionality of the latent features of a neural network describing a high dimensional dynamical system.

In some aspects, the optimal number of hidden nodes within a neural network model is well represented by the fundamental dimensionality of the manifold on which the data sits. The method described herein provides a way to estimate the fundamental dimension corresponding to a given dataset. A k-cross sampling technique may be implemented to provide robust reliable bounds on the estimated fundamental dimension corresponding to the given dataset. The estimated fundamental dimension is a good representation of the underlying number of latent features and hence the optimal number of hidden nodes to capture the nonlinear dynamics of a machine learning model. Further, an efficient fractal dimension computation may be offered using NOSQL database, improving the subsequent fundamental dimension estimation in speed and efficiency. Using the disclosed methods herein, guidance may be provided to the ideal neural network architecture allowing data scientists to avoid under and over training of the neural network leading to either under performance or over-fitted models capturing spurious relationships and noise in the data set which won't generalize. Other improvements include the circumvention of the need for expensive exhaustive grid search for number of hidden nodes.

In AI models, the fundamental dimensionality of a dataset that is used to train the model is most often not represented by the count of the observed data variables. The data collected from a business process is nearly always not smoothly distributed in the phase space, but concentrated around a non-linear manifold of much lower dimensionality. Latent variables define the dimensions of manifold capturing relationships between one or more observed variables in the larger variable space. A direct implication of this phenomenon is that the observed variables as encoded in the dataset do not linearly influence the distribution of the data with respect to the outcome of interest but combine in a non-linear fashion to define the latent variables which drive a prediction of the outcome, for example, whether an individual credit card will be fraud or not fraud based on 100s of features input to a machine learning model.

Being able to identify the fundamental dimensionality of the data set and approximate the number of underlying latent variables at the manifold level has a substantial influence on model quality, complexity and accuracy. AI models are representations of the data on which the models are trained. The models are configured for compressing the essential dynamics and relationships in the data space into latent features that drive prediction or identification of two or more classes of outcome. In the conventional machine learning approaches, measurement of the dimensionality of the latent feature space can be performed unsystematically or can be simply ignored.

Further, data scientists often resort to trying to measure information overlap between input features to reduce the input variable space without a notion of the non-linear dynamics that drive the class outcomes. This leads to undesirable effects, especially when the number of variables selected does not truly reflect the underlying latent dimensionality. In some scenarios, information loss and a suboptimal model may result, irrespective of the model architecture chosen. Also, in the conventional AI models, there is a tendency to over-specify models to try to capture some 'unknown' set of latent features in the data. This unfortunately leads to unnecessarily complex models and models that don't truly generalize in operations.

In accordance with one implementation, the ability to determine or estimate the true latent feature dimensionality allows a data scientist to specify the machine learning architecture with the correct number of latent features that would allow the models to encode the proper nonlinear relationships leading to the most optimal model without information loss or encoding of noise and spurious nonlinearities. Because data is almost never smoothly distributed in the data phase space, the data may be concentrated around a non-linear manifold of a much lower dimensionality. Thus, various subspaces in the data phase space may have different data coverage.

Data coverage refers to the number of data points available in a specific subspace of a data phase space. If each of the observed variables is binned into certain number of bins, the resultant hypercells formed by combinations of these bins will have differing numbers of data points due to the non-uniform distribution of the data points in the phase space. If a variable is binned into m bins, for example, the original N dimensional hypercube containing the entire data points is split into $m^N$ number of hypercells. Some of these hypercells will have no data coverage, whereas others around the underlying manifold region will have sufficient data coverage. Consider for example binning a 12 dimensional dataset with each variable binned into 10 bins. This will lead to $10^{12}$ hypercells, which is one trillion hypercells. Given that many datasets have far fewer number of data records, even for a relatively low dimensional dataset such as this example, 10 bins for each dimension leads to the majority of the hypercells being unpopulated.

Fractal Dimension and Fundamental Dimension

In certain embodiments, the fundamental dimension of the data relationships encapsulated within an available dataset may be computed using the empirical technique provided herein, by way of estimating the Fractal Dimension and using it as the basis of the fundamental dimensionality of data relationships. A dataset is represented on a simpler manifold represented by the fundamental dimensionality compared to the original dimensionality of the dataset. A dataset that represents multiple classes, such as a dataset representing fraud vs non-fraud outcomes, can also be treated using the proposed technique. For a dataset with two or more classes the localization of the various classes are represented by simpler decision boundaries on this fundamental manifold.

For example, consider a dataset representing various road conditions and the corresponding likelihood of an accident. The manifold dimension represented by the two observed variables, presence/absence of water on the road surface and the temperature of the road surface creates an important latent feature the presence/absence of ice. This manifold dimension is imputed irrespective of the class outcome (accident or no accident) and rather this dimension informs the likelihood of accident. In fact, various classes may sit across the same fundamental manifold with different probability distributions in different regions of this manifold with a decision boundary separating the classes.

Figure 2:
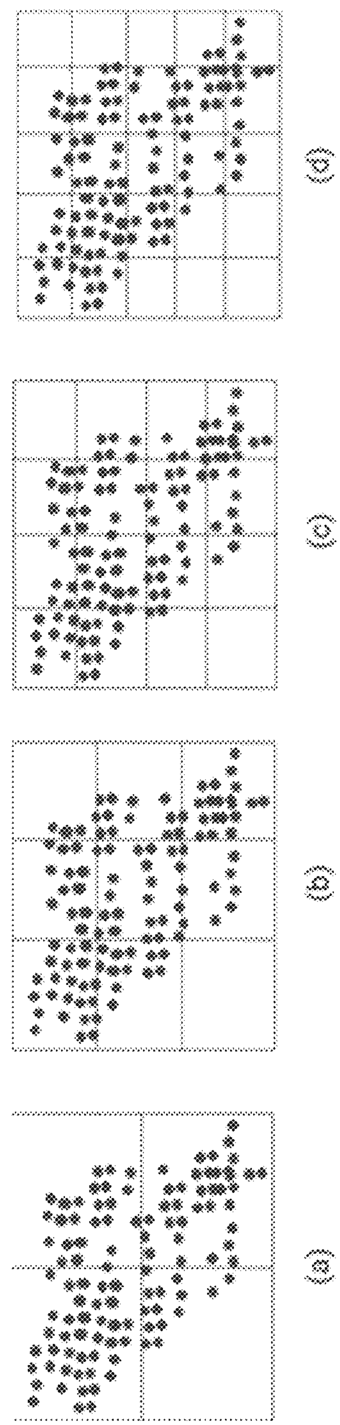
FIG. 2 is an example diagram illustrating a two-dimensional data distribution, where a fractal dimension is computed by iteratively applying successively smaller measuring units, in accordance with one embodiment.

Referring to FIG. 2, a two-dimensional data distribution is illustrated showing the impact of the data not being uniformly distributed and sitting on a lower dimensional manifold. As shown, in a two-dimensional data distribution where the data is not uniformly distributed, both the dimensions may be binned iteratively into increasing number of bins. As the number of bins increases, more and more proportions of resultant cells are presented without any data points. In FIG. 2(*a*), which shows two bins each, we have all the 4 cells populated. FIG. 2(*b*) shows 3 bins each with 8 cells populated. FIG. 2(*c*) has 4 bins each with 14 out of the 16 bins populated. Whereas FIG. 2(*d*) has 5 bins each with 18 out of 25 cells populated. The computed fractal dimensions are shown in Table 1 below.

The fractal dimension, or the box counting dimension, D, may be given by:

$$\eta=\varepsilon^{-D} \tag{1}$$

where, $\eta$ is the number of measuring units, and $\varepsilon$ is size of the measuring unit.

Thus, the dimension of the space is given by:

$$D=-\frac{\log(\eta)}{\log(\varepsilon)} \tag{2}$$

Consider, for example, a 3-dimensional space, with N=3, that is uniformly filled with data points. Further, consider that the dimensions are scaled between values of 0 and 1. We then split the 3 dimensions in 2 equal sized bins. This gives us the size of the measuring unit to be ½, i.e., $\varepsilon=½$. This leads to our 3-dimensional cube being split into 8 smaller cubes, each uniformly filled, i.e., $\eta=8$. This gives us the computed fractal dimensionality, D=3, using equation (2). Note an important relationship between number of bins for each dimension and the size of the measuring unit, $\varepsilon=1/m$.

Consider the scenario where the data is not uniformly distributed, but instead concentrated in certain localized regions in the 3-dimensional space. In such a case, by splitting each dimension in 2 equal bins, i.e., $\varepsilon=½$, some of the cubes will be empty of data points. These cells which do not have any data points are said to have zero data coverage. For example, assume 5 smaller cubes that have data coverage, with the remaining 3 cubes being empty. In such a case, $\eta=5$, and this gives us the computed fractal dimensionality, D=2.32, using equation (2).

A two-dimensional example in FIG. 2 is illustrated. In this example, as the number of bins for each of the two dimensions is increased, the fractal dimension computed using equation (2) changes. The computed fractal dimension for each of the scenarios is shown in Table 1 below illustrating the computed fractal dimension for scenario depicted in FIG. 2.

TABLE 1

| Number of Bins | Number of Populated Cells | Fractal Dimension |
|---|---|---|
| 2 | 4 | 2.00 |
| 3 | 8 | 1.89 |
| 4 | 14 | 1.90 |
| 5 | 18 | 1.80 |

After estimating a fractal dimension for a given dataset, its fundamental dimensionality at the manifold level can be estimated by leveraging Takens' Theorem. Takens' Theorem establishes the embedding dimension of the dynamics is more than 2 times the Fractal dimension. As we are trying to embed the dynamics and data relationships into the latent features, the fundamental dimension is the embedding dimension. Thus, the fundamental dimensionality, $D^F$, follows the following relationship with the fractal dimension, D:

$$D^F \leq 2D+1 \tag{3}$$

The fundamental dimension, $D^F$, may need to be an integer in building machine learning models. The formula may be adjusted to an integer value of $D^F$ as shown in equation (4) below:

$$D^F = \mathrm{ROUNDUP}(2D+1) \tag{4}$$

where, ROUNDUP returns the smallest integer value larger than or equal to the supplied value of 2D+1.

In one aspect, to compute the fundamental dimension of a data phase space, the fractal dimension is computed as represented by equation (2), and then leverage equation (4) to get an estimate of the fundamental dimension, $D^F$. $D^F$ is the theoretical embedding dimension based on the fractal dimension, D.

In one implementation, a data phase space is defined in terms of the N observed variables, $v_1 \ldots v_N$, in the dataset. Class labels are not considered in the variable counts. For each variable, $v_i$, we consider their minimum value, $v_{i,min}$ and their maximum value, $v_{i,max}$. The variable may be scaled between 0 and 1 and equisized into m bins of size $\varepsilon=1/m$. To do this, we assign a bin index, j, to the value of the variable $v_i$, where the bin index j for the supplied value of $v_i$ is given by:

$$j = \min\left[INT\left(m\left(\frac{v_i - v_{i,min}}{v_{i,max} - v_{i,min}}\right)\right) + 1,\ m\right] \tag{5}$$

where the function INT( ) returns the integer part of a decimal number supplied as the parameter and min( ) function returns the minimum of the two values supplied to it.

Using equation (5) for each data point, we calculate the bin indices for each of the N observed variables, $v_1 \ldots v_N$. The choice of equisized bin is deliberate, in certain embodiments, so that the size of the corresponding measuring unit is consistently 1/m, or ε. This generates a set of hypercells with each of their edges of the size ε. For each hypercell, we then measure whether there is data coverage. A schematic example of this approach is shown in FIG. 2 as discussed earlier. This leads to the original N dimensional hypercube containing the entirety of data points split into $m^N$ number of equisized hypercells in the scaled variable space.

The binning is done iteratively by splitting each of the N observed variables into successively increasing number of equisized hypercubes, i.e., increasing values of m, with the edges of the hypercells of size 1/m. As m increases, the size of measuring unit decreases resulting in finer hypercells and lesser number of them being populated with data points.

In accordance with one implementation, the number of cells, η, that are populated by data points are counted, i.e., have data coverage. Leveraging equation (2), we then compute the fractal dimension of the data subspace for the equisized hypercells with edge size of ε or 1/m. We control the value of ε by varying the value of m. Note that equation (2) can be rewritten, for a particular value of m, in terms of the populated hypercells, as follows:

$$D_m = -\frac{\log(\eta)}{\log(\varepsilon)} = \frac{\log(\text{number of populated hypercells})}{\log(m)} \tag{6.a}$$

The estimation of fractal dimension is influenced by the number of data points in the dataset and the underlying distribution of such data point. As the number of hypercells, m, increases, the data coverage of the hypercells is quickly reduced. To avoid loss of information while calculating fractal dimension, cells with a minimum data coverage are considered. In practice, taking a large minimum data coverage is not sometimes viable due to loss of data points, and the minimum data coverage can often be taken as 1 data point. Thus, Equation (6.a) can be adjusted to consider all the cells that are populated with a minimum number of data points, i.e., have a minimum threshold of data coverage, Θ, as follows:

$$D_m(\Theta) = -\frac{\log(\eta(\Theta))}{\log(\varepsilon)} = \frac{\log(\text{number of populated hypercells with coverage} \geq \Theta)}{\log(m)} \tag{6.b}$$

Correspondingly, the fundamental dimension expressed by equation (4) is restated as follows:

$$D_m^F(\Theta) = \mathrm{ROUNDUP}(2D_m(\Theta)+1) \tag{6.c}$$

In certain aspects, Θ=1 is considered by default and $D_m^F(1)$ is specified as $D_m^F$. The computed fractal dimension, converges with increasing hypercells.

Figure 3:
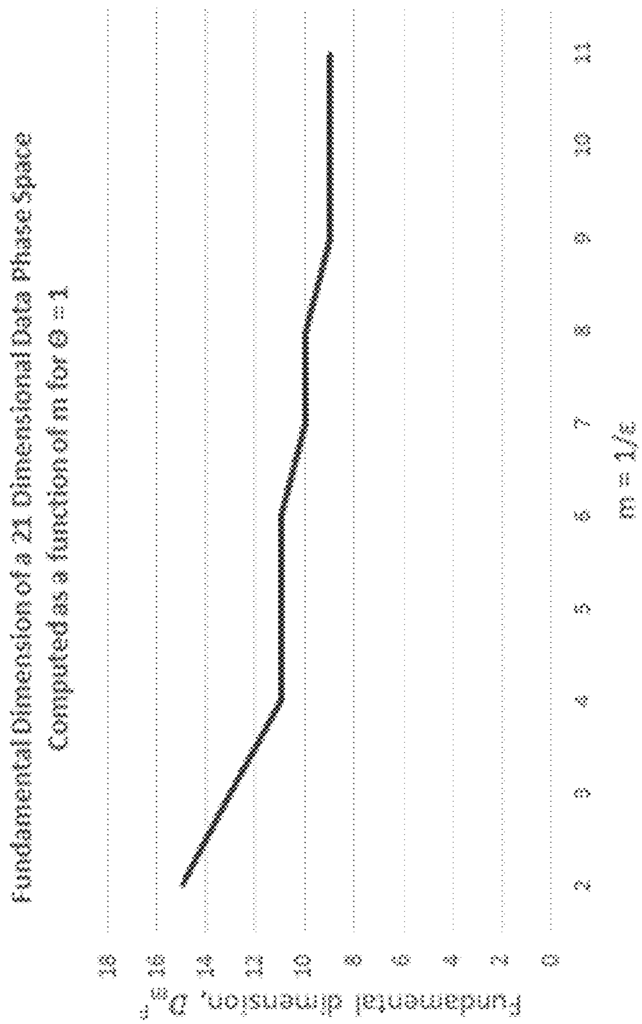
FIG. 3 is an illustrative graph of the computed fundamental dimension for a credit lending dataset with N observed variables, in accordance with one embodiment.

Referring to FIG. 3, the computed fundamental dimension are shown using equation (6.c) for a credit lending dataset with N observed variables, where N=21, as a function of the number of bins, m. Cells with at least 1 data point were considered making this equivalent of D(Θ=1). This dataset represents the behavior of various borrowers across multiple credit lines and their eventual outcomes in terms of whether they paid back or defaulted on the repayment of the loan. The computed fundamental dimension of a 21-dimensional dataset as a function of m, may be calculated using equation (6.c). The computed fundamental dimension values converge to a value of 9. A cell with data coverage of at least 1 data point has been considered, i.e., Θ=1.

As the edge size ε(=1/m) decreases, the number of equisized hypercubes increases and the computed value of the fractal dimension converges to a value that we refer to as converged fractal dimension. Thus, the converged fractal dimension is given by:

$$D_{conv}(\Theta) = D_m(\Theta) \text{ for large values of } m \tag{7}$$

To determine statistically reliable estimates for the converged fractal dimension, a k-fold cross sampling may be applied on the given dataset. The dataset may be randomly split into k subsets, numbered 1 through k respectively. This can be achieved by randomly assigning each of the records, or data points, in the dataset a number between 1 and k, both inclusive, as a set id. For value of the set id, denoted by i, the remaining k−1 subsets may be merged to generate merged samples, $S_i$. Thus, the sample $S_i$ may have all the records, or data points, with the set ids of 1 through k, except set id i.

For a merged sample $S_i$, the converged fractal dimension, $D^i_{conv}(\Theta)$ is computed, using equation (7) by considering hypercells generated from $S_i$ with data coverage of at least 1 data point. This allows for the generation of k values of the converged fractal dimension for the given dataset. The mean value of this distribution, $D^\mu_{conv}(\Theta)$, is taken as the estimate of the converged fractal dimension and its confidence interval is provided by the standard deviation of this distribution, $D^\sigma_{conv}(\Theta)$.

$$D^\mu_{conv}(\Theta) = \frac{\sum_{k=i}^{k} D^i_{conv}(\Theta)}{k} \tag{8.a}$$

$$D^\sigma_{conv}(\Theta) = \sqrt{\frac{\sum_{k=i}^{k} \left(D^i_{conv}(\Theta) - D^\mu_{conv}(\Theta)\right)^2}{k}} \tag{8.b}$$

The converged fractal dimensionality of the dataset may thus be estimated and then leverage equation (6.c) may be used to get an estimate of the fundamental dimensionality of the dataset, which may be rewritten as follows:

$$D^F = \text{ROUNDUP}[2D^\mu_{conv}+1] \tag{9}$$

where, $D^\mu_{conv}$ is the estimated mean value of converged fractal dimension computed using k-fold cross sampling, as given by equation (8.a).

Figure 4A:
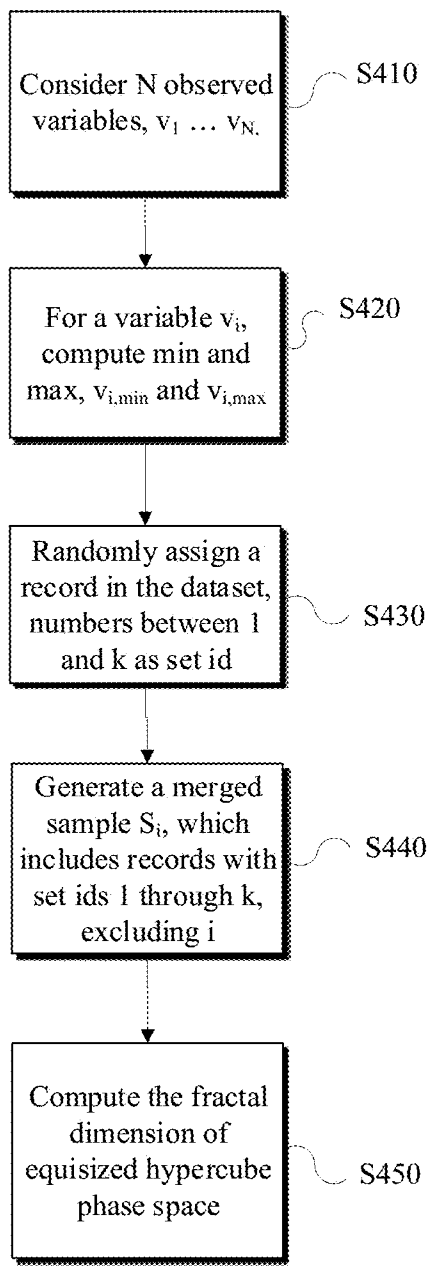
FIG. 4A is an example flow diagram of a method of providing latent feature dimensionality bounds for robust machine learning on high dimensional datasets, in accordance with certain embodiments.

Referring to FIG. 4A and to summarize the above functionality and processes, a method of providing latent feature dimensionality bounds for robust machine learning on high dimensional datasets may include:

Consider N observed variables, $v_1 \ldots v_N$, of the dataset. Exclude class labels (S410);

For a variable $v_i$, compute min and max, $v_{i,min}$ and $v_{i,max}$ respectively (S420) and Generate k-fold cross samples as follows:

Randomly assign a record in the dataset, numbers between 1 and k as set id (S430);

For one or more values of set id, i, where, i goes from 1 to k, generate a merged sample $S_i$, which includes records with set ids 1 through k, excluding i (S440);

For a sample $S_i$, bin each variable into m equisized bins, starting from 2 bins and iteratively increasing the number of bins by normalizing each variable between 0 and 1 and then splitting them into equisized bins of 1/m.

Compute the fractal dimension of the equisized hypercube phase space (S450) based on the count of cells with data coverage of at least 1 data point using equations (8).

To generate equisized bins, a variable may be normalized between 0 and 1 and then split into equisized bins of 1/m. The bin index may be determined by equation (5), which generates $m^N$ equisized hypercells with edge size 1/m and equation (9) may be used to estimate the fundamental dimensionality.

Example Efficient Implementation

As the size ε=1/m of the hypercell is decreased, the number of hypercells increase rapidly. A fast implementation using a key value NOSQL database may be achieved for efficient counting of the hypercells and recording hypercells populated. For a given value of m, the bins of each variable are indexed between bin 1 through bin m, with 1 being the lowest value bin and m representing the highest value bin for the given variable, using equation (5). For a set of N variables, with m bins, a particular data point is represented in a hypercell which is indexed using an ordered list of bin indices with N values for N variables.

To construct the bin index, the first position may be assigned to variable $v_1$ taking on values 1 through m, the second position may be assigned to variable $v_2$ taking on values 1 through m, and so on. The value in these positions may correspond to the bin index of the corresponding variable as given by equation (5). For example, the hypercell with index {2, 1, 2} means that for an enclosed data point in that hypercell, the value of $v_1$ falls in the $2^{nd}$ bin of $v_1$, the value of $v_2$ falls in the $1^{st}$ bin of $v_2$, and the value of $v_3$ falls in the $2^{nd}$ bin of $v_3$. This representation of the indices may be referred to as a hypercell vector. In example implementations, a two-dimensional space, N=2, where both the dimensions are iteratively binned into 2, 3 and 4 bins may be provided, as illustrated in more detail in FIG. 4B, where m takes values from 2 to 4.

Figure 4B:
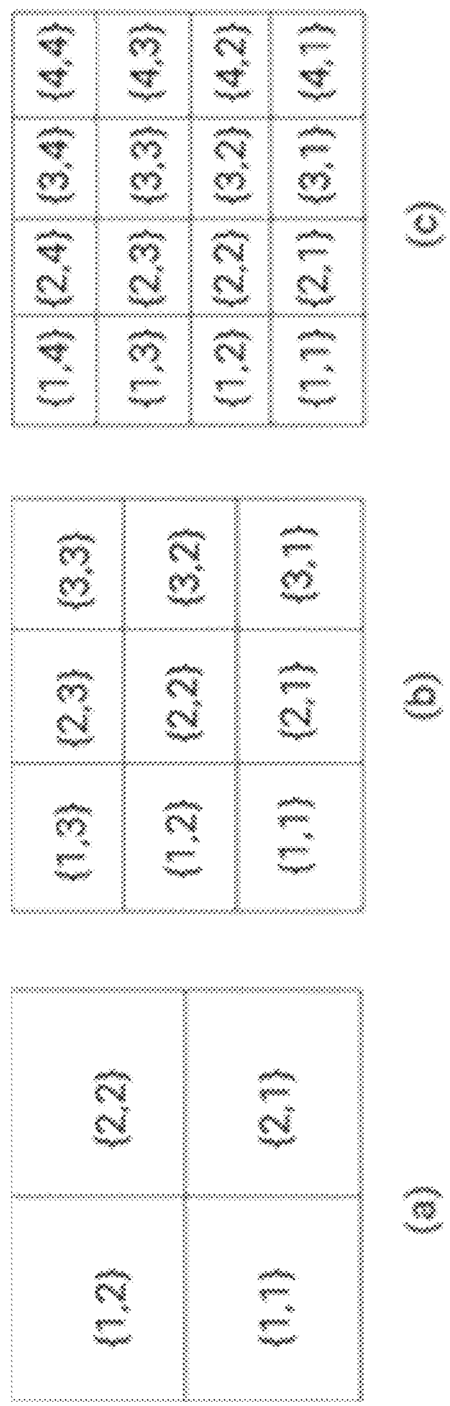
FIG. 4B is a schematic example of a two-dimensional space, where the dimensions are iteratively binned into 2, 3 or 4 bins, in accordance with one or more embodiments.

Referring to FIG. 4B, for various scenarios, the hypercell vectors are shown within the 2-dimensional hypercells. Traversing through the dataset, the hypercell vector for a data point may be generated using the approach described in the previous paragraph. We then update the NOSQL database, with the hypercell vector as the key. After doing so, we move to the next data point in the dataset.

For updating the NOSQL database with the hypercell vector, two different implementations may be considered. In the first implementation, the computed hypercell vector for the data record is used to retrieve the store associated with the key and increment the count by 1. In the second implementation, pertaining to the scenario where Θ=1, the hypercell vector of the data record may be computed to write 1 to the store in the NOSQL database. The later implementation may be significantly faster in terms of computations of the fractal dimension. The former implementation may be computationally slower in comparison but can be used for cases where we need to apply data coverage thresholds, i.e., where Θ>1.

Referring to FIG. 5, in both of the above implementations, the fact that the phase space is sparsely populated may be leveraged for a large dimensional and fine-binned data phase space, and data points often sit on a much lower manifold. Thus, the number of entries in this database is far smaller than the total possible number of hypercells, $m^N$. The maximum possible number of entries in the database may be no more than the total number of records in the data set, corresponding to each data point sitting in a unique hypercell. For the purpose of counting the cells with data coverage of at least one data point to apply to the equation (8), we simply count the number of entries in this key value database.

FIG. 5(*a*) shows the key value of a 3 dimensional dataset with m=2 with 1315 data points in a hash table with the hypercell vectors used as keys and the values correspond to the counts of the data points.

FIG. 5(*b*) shows the faster implementation where Θ=1. In this case, we are only interested in knowing whether the hypercell has at least one data point. Thus, merely recording an entry for the hypercell vector is sufficient to indicate that it has at least one data point.

In FIG. 5(*c*) we show the same dataset with m=3. Note that going from m=2 to m=3, the number of hypercells go from 8 to 27. But only 18 of these hypercells are populated, i.e., have data coverage. In general, as m increases, the number of entries in this database is usually far smaller than the total possible number of hypercells, $m^N$. The total number of entries in the NOSQL data based is always less the total number of data records in the dataset.

In one implementation, a key value database is utilized to record the populated hypercells of a 3 dimensional dataset with 1315 data points and two bins. FIG. 5 (*a*) shows the hypercell vectors keys the values correspond to the counts of the data points. FIG. 5 (*b*) shows the hypercell vectors are stored in a list. The number of entries in both (a) the hash table and (b) list is $2^3$, where 2 is the number of bins and 3 is the number of variables, or 8 equisized hypercells. FIG. 5(*c*) shows that for larger number of bins, m, the number of entries in this database is usually far smaller than the total possible number of hypercells, $m^N$. The total number of entries in the NOSQL data based is always less the total number of data records in the dataset. For m=3, these 1315 data points are spread across only 18 of the total 27 hypercells.

Example Benefit of Knowing an Estimate of the Fundamental Dimensionality for Machine Learning Knowing an estimate of the fundamental dimensionality has benefits in understanding the proper number of latent features that describe the dynamics of the model. One implication of this is in training a neural network model. The architecture of the neural network allows for projecting the input variables, which are either directly observed variables or derived from observed variables, to a manifold represented by the hidden layer of the model. Each node in the hidden layer represents a non-linear dimension representing the underlying manifold and significant nonlinear relationships between all data inputs.

A challenge in training a neural network model is knowing the fundamental dimensionality of the manifold on which data sits and correspondingly the correct number of latent features describing the manifold. If the estimate is too low, and thus the number of hidden nodes are correspondingly chosen to be low, the trained model performs at sub optimal level due to loss in information and averaging relationships across too few latent features. On the other hand, if the estimate is too high, and thus the number of hidden nodes are correspondingly chosen to be high, the trained model is unnecessarily complex and over-trained without any corresponding benefit in model's accuracy and is often dangerous in learning spurious relationships in the data set which will not generalize in the use of the model in production.

Thus, the estimate of the fundamental dimensionality provides a good mechanism to get the right number of hidden nodes in the hidden layers of a neural network model to specify in the model architecture utilized. An illustrative example includes analysis of dataset corresponding to payment card fraud detection models, where the dataset has 180 predictive variables and 25 million records, for example. The records are labeled as either in a state of fraud (bad) or not being in a state of fraud (good).

Applying a method consistent with the current disclosure to this dataset, the fundamental dimension using k-fold cross sampling was estimated with k=30. The dataset was split into 30 sets of approximately 833 thousand records each. In each of the 30 iterations, 29 sets were considered, leaving one set out. This led to about 24 million records being considered in each iteration. Correspondingly, the converged mean value of 6.28 was computed for the fractal dimension using equation (7.a). The fundamental dimensionality was estimated to be 14 by leveraging equation (9). With the use of k-cross sampling it was possible to achieve a very low standard deviation of 0.002 on the fractal dimension using equation (7.b), giving strong confidence in the estimated fundamental dimensionality.

Multiple optimal neural network models were then trained to predict a payment card account to be in a state of fraud by varying the number of hidden nodes. In one embodiment, the training was done by a grid search on the number of hidden nodes to build a neural network model to find the best value of training parameters that leads to the best performing model.

Figure 6:
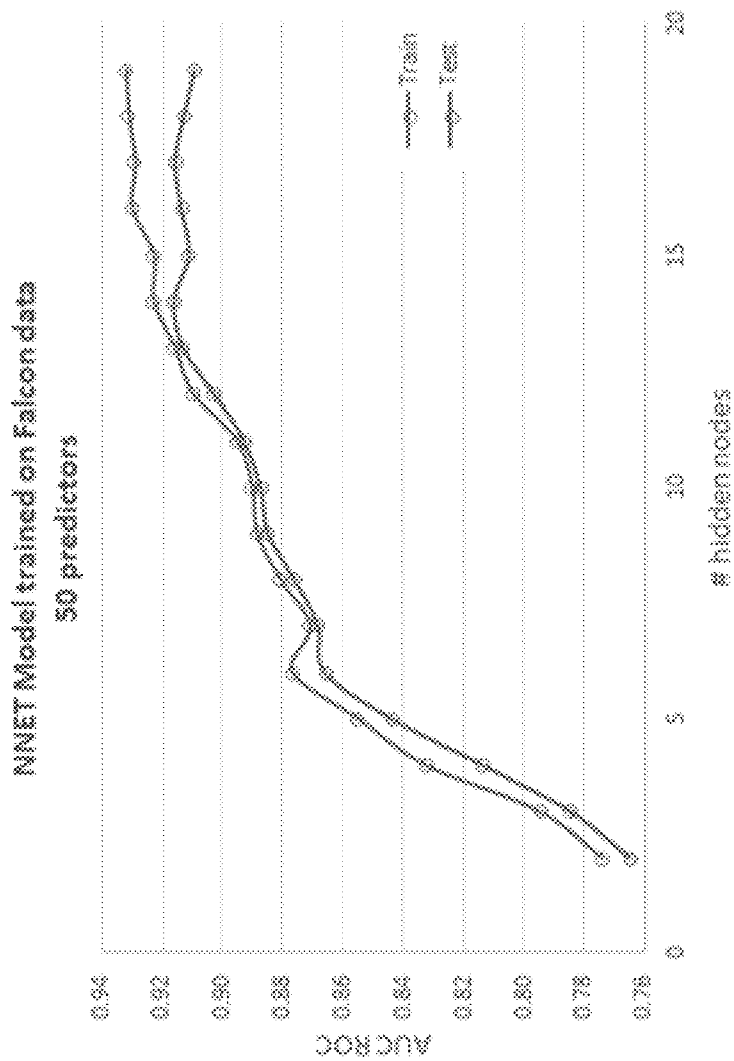
FIG. 6 shows an example plot of area under the receiver operating characteristic (ROC) curve as a function of number of hidden nodes trained on this dataset in certain embodiments.

Referring to FIG. 6, performance of neural network model trained to predict a payment card account to be in a state of fraud, as measured by area under the receiver operating characteristic curve (AUC ROC) as a function of number of hidden nodes in a single hidden layer neural network model. The performance of the model starts plateauing at the fundamental dimensionality of 14 estimated using the currently disclosed method. Further, the difference in performance between the training and the test dataset increases past the fundamental dimension and diverges showing worse generalization. The vertical red line in the figure represents the estimated fundamental dimension and thus proper number of latent features for this data.

As shown in FIG. 6, the plot of area under the receiver operating characteristic (ROC) curve as function of number of hidden nodes trained on this dataset, where the number of input variables is 50. As can be seen, the performance gain starts plateauing around 14 hidden nodes, the number of hidden nodes corresponding to the fundamental dimensionality estimated using the currently disclosed method. The deviation between train and test performance begins to degrade at 15 hidden nodes indicating that past 14 hidden nodes the network is learning spurious relationships or noise.

The disclosed systems and methods and the suggested improvements in neural network model training process by leveraging the described systems and methods provide an improved approach for identifying an estimate on the number of optimal hidden nodes in a neural network model. The fundamental dimension corresponding to a dataset reflects as the optimal number of hidden nodes in a neural network model. Using the disclosed approach, an exhaustive and expensive grid search on a large search space can be reduced to a small search at the estimated fundamental dimensionality as indicated by equation (9).

Figure 7:
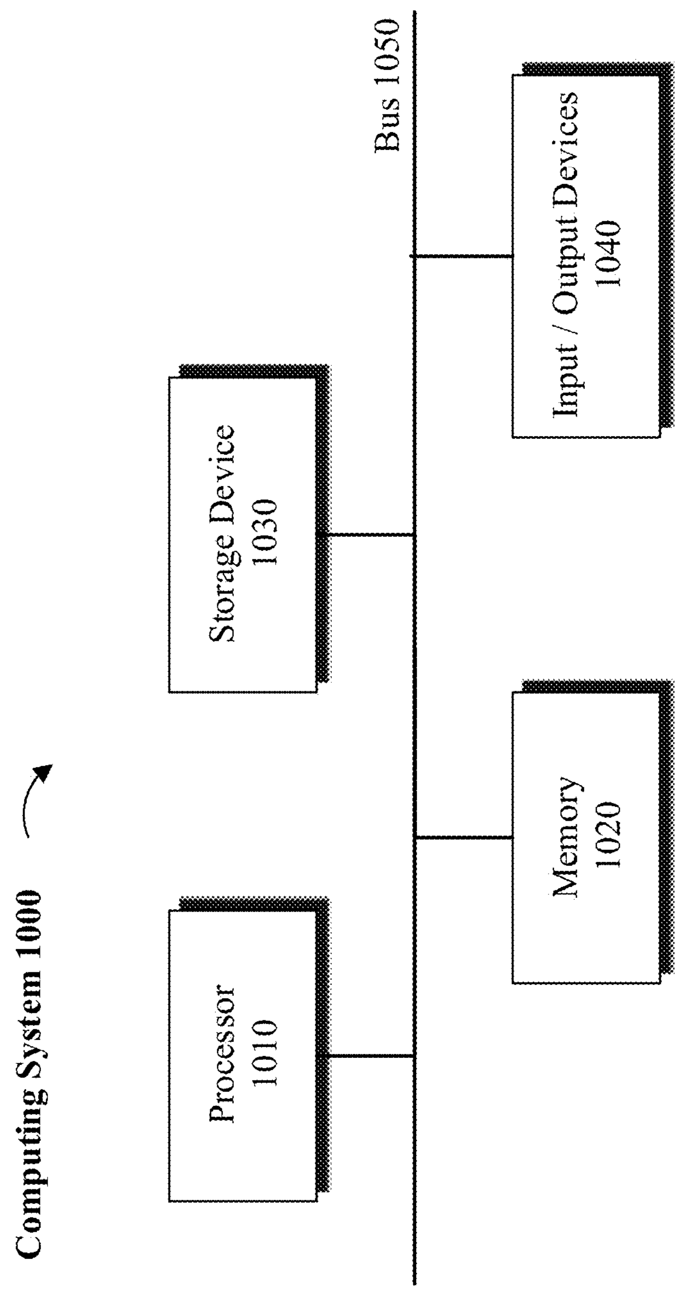
FIG. 7 is a block diagram of an example computing system that may be utilized to perform one or more computing operations or processes as consistent with one or more disclosed features.

Referring to FIG. 7, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 7, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent documents or the patent disclosure, as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method for quantifying appropriate machine learning model complexity corresponding to a training dataset, the method comprising:

monitoring, using one or more processors, N observed variables, $v_1$ through $v_N$, of a training dataset for training a machine learning model, the training dataset having a first dimension;

translating the N observed variables into m equisized bin indexes to generate $m^N$ equisized hypercells;

generating one or more samples by assigning a record in the training dataset with numbers j through k as set id;

generating a merged sample Si, for one or more values of the set id i, where i goes from j to k;

estimating a fractal dimension of the equisized hypercube phase space based on count of cells with data coverage of at least one data point;

determining a fundamental dimensionality for the training dataset based on the estimated fractal dimension;

adjusting the training dataset's dimensionality from the first dimension to a second dimension;

defining an optimal number of latent features according to the fundamental dimensionality; and training the machine learning model using the defined optimal number of latent features and the training dataset having the second dimension.

2. The method of claim 1, wherein training data in the training dataset excludes class labels for the purpose of computing latent feature dimensionality.

3. The method of claim 1, wherein the samples are generated as k-fold cross samples applied to the training dataset to randomly split the training dataset into k subsets, with at least one record being assigned to a number from 1 through k as set id.

4. The method of claim 1, wherein the N observed variables are normalized to a range of 0 to 1 and translated into m equisized bin indexes.

5. The method of claim 4, wherein the m equisized bin indexes generate $m^N$ possible equisized hypercells with edge size 1/m.

6. The method of claim 1, wherein the sample Si includes records with set ids 1 through k, excluding i.

7. The method of claim 6, wherein the fractal dimension is computed using k-cross fold validation according to:

$$D^{\mu}_{conv}(\Theta) = \frac{\sum_{i=i}^{k} D^{i}_{conv}(\Theta)}{k}.$$

8. The method of claim 7, wherein the optimal number of latent features is given by Takens Theorem as follows:

$$D^F=\text{ROUNDUP}[2D^{\mu}_{conv}+1].$$

9. The method of claim 8, wherein Θ=1.

10. The method of claim 9, wherein a population of $m^N$ possible equisized hypercells is represented by a key value NOSQL database.

11. The method of claim 10, wherein the key value is an index of N bin values corresponding to N variables in the training dataset.

12. The method of claim 10, wherein the population of $m^N$ possible equisized hypercells is the number of initialized values of the NOSQL database.

13. The method of claim 1, wherein the binning starts from two bins and the number of bins is iteratively increased by splitting the bins into equisized bins of 1/m.

14. The method of claim 1, wherein a fractional dimension is approximated by a box-counting dimension with a minimum coverage:

$$D_m(\Theta) = -\frac{\log(\eta(\Theta))}{\log(\varepsilon)} = \frac{\log(\text{number of populated hypercells with coverage} \geq \Theta)}{\log(m)}.$$

15. A system comprising:

at least one programmable processor; and a non-transitory machine-readable medium storing instructions that, when executed by the at least one programmable processor, cause the at least one programmable processor to perform operations comprising:

monitoring N observed variables, $v_1$ through $v_N$, of a training dataset for a machine learning model, the training dataset having a first dimension;

translating the N observed variables into m equisized bin indexes which generate $m^N$ possible equisized hypercells to estimate a fundamental dimensionality for the training dataset;

generating one or more samples by assigning a record in the training dataset with numbers j through k as set id;

generating a merged sample Si, for one or more values of the set id i, where i goes from j to k;

estimating a fractal dimension of the equisized hypercube phase space based on count of cells with data coverage of at least one data point;

determining a fundamental dimensionality for the training dataset based on the estimated fractal dimension;

defining an optimal number of latent features according to the fundamental dimensionality; and training the machine learning model using the defined optimal number of latent features.

16. The system of claim 15, wherein training data in the training dataset excludes class labels for the purpose of computing latent feature dimensionality.

17. The system of claim 15, wherein the samples are generated as k-fold cross samples applied to the training dataset to randomly split the training dataset into k subsets, with at least one record being assigned to a number from 1 through k as set id.

18. The system of claim 15, wherein the N observed variables are normalized to a range of 0 to 1 and translated into m equisized bin indexes.

19. A computer program product comprising a non-transitory machine-readable medium storing instructions that, when executed by at least one programmable processor, cause the at least one programmable processor to perform operations comprising:

monitoring, using one or more processors, N observed variables, $v_1$ through $v_N$, of a training dataset for a machine learning model, the training dataset having a first dimension;

translating the N observed variables into m equisized bin indexes which generate $m^N$ possible equisized hypercells to estimate a fundamental dimensionality for the training dataset;

generating one or more samples by assigning a record in the training dataset with numbers j through k as set id;

generating a merged sample Si, for one or more values of the set id i, where i goes from j to k; and estimating a fractal dimension of the equisized hypercube phase space based on count of cells with data coverage of at least one data point;

determining a fundamental dimensionality for the training dataset based on the estimated fractal dimension;

adjusting the training dataset's dimensionality from the first dimension to a second dimension; and training the machine learning model using the training dataset having the second dimension.

20. The computer program product of claim 19, wherein training data in the training dataset excludes class labels for the purpose of computing latent feature dimensionality, the samples are generated as k-fold cross samples applied to the training dataset to randomly split the training dataset into k subsets, with at least one record being assigned to a number from 1 through k as set id, wherein the N observed variables are normalized to a range of 0 to 1 and translated into m equisized bin indexes.

* * * * *